(12) United States Patent
Miller

(10) Patent No.: US 9,995,430 B2
(45) Date of Patent: Jun. 12, 2018

(54) TRUSS HANGER

(71) Applicant: CHAUVET & SONS, LLC, Wilmington, DE (US)

(72) Inventor: William K. Miller, Hollywood, FL (US)

(73) Assignee: Chauvet & Sons, LLC, Wilmington, DE (US)

(*) Notice: Subject to any disclaimer, the term of this patent is extended or adjusted under 35 U.S.C. 154(b) by 0 days. days.

(21) Appl. No.: 15/269,280

(22) Filed: Sep. 19, 2016

(65) Prior Publication Data

US 2018/0080602 A1 Mar. 22, 2018

(51) Int. Cl.
 *F16M 13/02* (2006.01)
(52) U.S. Cl.
 CPC ....... *F16M 13/02* (2013.01); *F16M 2200/028* (2013.01); *F16M 2200/065* (2013.01)
(58) Field of Classification Search
 CPC .... F16M 13/02; F16M 11/08; F16M 11/2085; F16M 11/28; F16M 2200/028; F16M 2200/065; H04N 5/64
 USPC ......................................................... 211/26
 See application file for complete search history.

(56) References Cited

U.S. PATENT DOCUMENTS

| 2,470,992 | A | * | 5/1949 | Kindorf | F16L 3/24 248/72 |
|---|---|---|---|---|---|
| 2,751,175 | A | * | 6/1956 | Jones | F16L 3/24 248/72 |
| 2,868,485 | A | * | 1/1959 | Friel | F16L 3/24 248/59 |
| 3,664,626 | A | * | 5/1972 | Sneller | A47H 1/00 248/214 |
| 4,088,079 | A | * | 5/1978 | Herzog | E01B 25/24 104/110 |
| 5,085,660 | A | * | 2/1992 | Lin | A61B 17/8057 606/288 |
| 5,334,203 | A | * | 8/1994 | Wagner | A61B 17/7052 24/396 |
| 5,897,088 | A | * | 4/1999 | Kirschner | F16B 2/02 248/300 |
| 6,287,309 | B1 | * | 9/2001 | Baccelli | A61B 17/7007 606/292 |
| 6,302,883 | B1 | * | 10/2001 | Bono | A61B 17/7058 606/291 |
| 6,432,108 | B1 | * | 8/2002 | Burgess | A61B 17/7052 606/252 |
| 6,641,583 | B2 | * | 11/2003 | Shluzas | A61B 17/7004 606/252 |
| 6,962,234 | B1 | * | 11/2005 | Reeves | E04G 21/3261 182/36 |
| 7,069,681 | B2 | * | 7/2006 | Noble | E01F 9/696 40/490 |

(Continued)

*Primary Examiner* — Ko Hung Chan
(74) *Attorney, Agent, or Firm* — Laurence A. Greenberg; Werner H. Stemer; Ralph E. Locher

(57) ABSTRACT

An adjustable truss hanger is provided that creates a hang point that extends beyond, and outside of, the two upper chords of a horizontal box truss. Two clamps affix the truss hanger to the upper chord pair of a horizontally oriented box truss. The hanging point is provided on at least one end of the truss hanger bar, and not between the clamps, for providing the hanging point at the end of a cantilever. Objects, such as video panels and/or video walls, can thus hang in front of the horizontal truss, obscuring the truss from view.

14 Claims, 4 Drawing Sheets

(56) References Cited

U.S. PATENT DOCUMENTS

| | | | |
|---|---|---|---|
| 7,491,221 B2* | 2/2009 | David | A61B 17/7007 606/266 |
| 7,608,096 B2* | 10/2009 | Foley | A61B 17/7007 606/280 |
| 8,714,502 B1* | 5/2014 | Davis | E04B 9/006 248/214 |
| 8,931,747 B2* | 1/2015 | Davis | F16B 1/00 248/214 |
| 8,950,716 B2* | 2/2015 | Kempf | F16M 13/02 248/229.2 |
| 2007/0163834 A1* | 7/2007 | Casebolt | A62B 35/0068 182/3 |
| 2015/0316202 A1 | 11/2015 | Chouinard | |

* cited by examiner

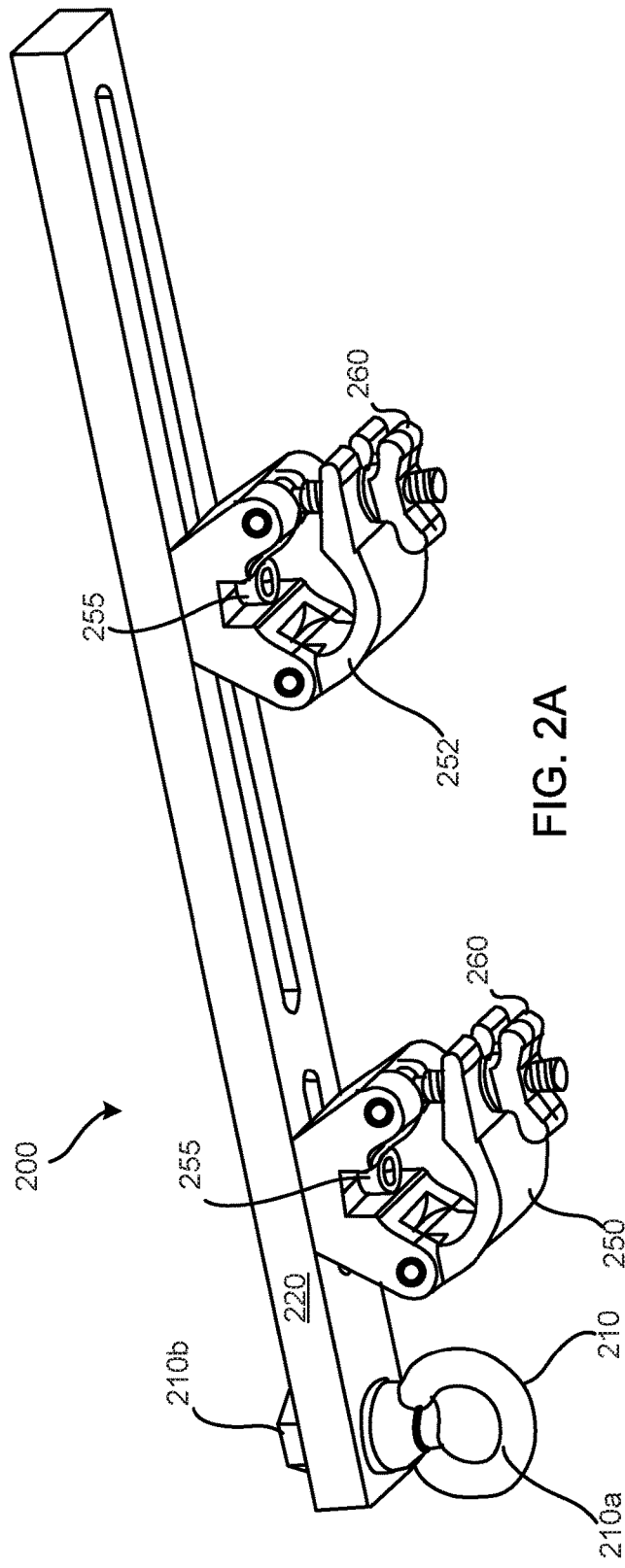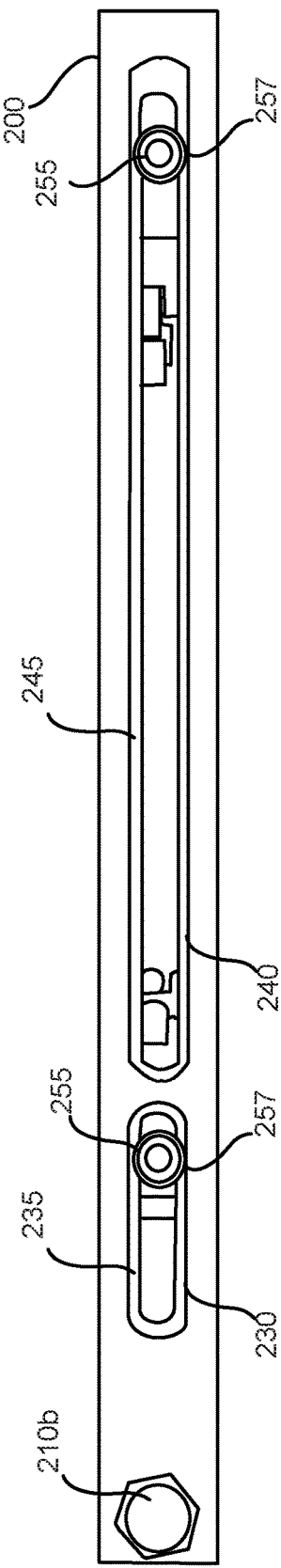
FIG. 2A
FIG. 2B

TRUSS HANGER

BACKGROUND OF THE INVENTION

Field of the Invention

The present invention relates to stage trusses used at entertainment events and, more particularly, to a truss hanger for providing a hang point on a box truss for hanging video or the like off of the truss.

Description of the Related Art

Previously, video walls, LED screens and other elongated panels have been hung from the lower chords of a horizontal box truss by either direct attachment to the horizontal box truss, or to a mounting bar attached to the lower chord of the horizontal box truss. This leaves the entire horizontal box truss visible above the video wall, which is not aesthetically pleasing, and may prevent its use for certain applications.

Thus, there is a need in the art for a new and improved way to hang a video panel or wall from a horizontal box truss that blocks all or substantially all of the horizontal box truss from which the video panel wall is hung. What is further needed is a device and method for hanging a panel from the upper chords of a horizontally oriented box truss.

U.S. Patent Application Publication No. 2015/0316202 to Chouinard, incorporated herein by reference, discloses a truss adapter for mounting objects on a space frame truss, including a bracket for attaching a television to a mount attached to a triangular truss. What is needed is a more simple way of attaching a panel, such as a video panel, to a tubular truss.

Truss hangers have previously been known. For example, German Light Products offers a truss hanger 100, shown in FIG. 1, in which a hanging point or eyebolt 110 is provided in the middle of a hanger bar 120, between two clamps 130. The clamps 130 are adjustable on the hanger bar 120 by movement along the slots 140. However, the truss hanger 100 cannot be used to hang anything from the hanging point 110 in front of the truss structure, as the hanging point 110 is located between the clamps 130.

What is further needed is a truss bar hanger that provides a hanging point for hanging an object in front of or behind the truss structure.

BRIEF SUMMARY OF THE INVENTION

The present invention is particularly suited to overcome those problems which remain in the art in a manner not previously known or contemplated. It is accordingly an object of the invention to provide an adjustable truss hanger that provides a hang point that extends beyond, and outside of, the two upper chords of a horizontal box truss, in order to support a hanging object, such as a video panel or video walls directly in front of the truss. In one particular embodiment of the invention, the truss hanger is provided with two clamps for affixing the truss hanger to the upper chord pair of a box truss. In this embodiment, a hanging point or eyebolt is provided on at least one end of the truss hanger, and not between the two clamps, for suspending the truss hanger as a cantilever in front of the truss, to help hide the truss on which the truss hanger is secured from view from the front.

Although the invention is illustrated and described herein as embodied in an adjustable truss hanger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The foregoing background, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings:

FIG. 2A is a perspective view of a video hanger truss bar, in accordance with one particular embodiment of the invention;

FIG. 2B is a top plan view of a video hanger truss bar, in accordance with one particular embodiment of the invention;

DETAILED DESCRIPTION OF THE INVENTION

Before explaining the disclosed embodiment of the present invention in detail, it is to be understood that the invention is not limited in its application only to the details of the particular arrangement shown since the invention is capable of other embodiments. Also, the terminology used herein is for the purpose of description and not of limitation. For purposes of the present application, the term box truss is meant to encompass those structures known in the art as a box truss, square truss, rectangular truss, tubular truss and/or stage truss, and those terms are used interchangeably herein. Note that other shapes (e.g., triangular, etc.) of truss can additionally be used in connection with the present invention, without limitation.

Figure 1:
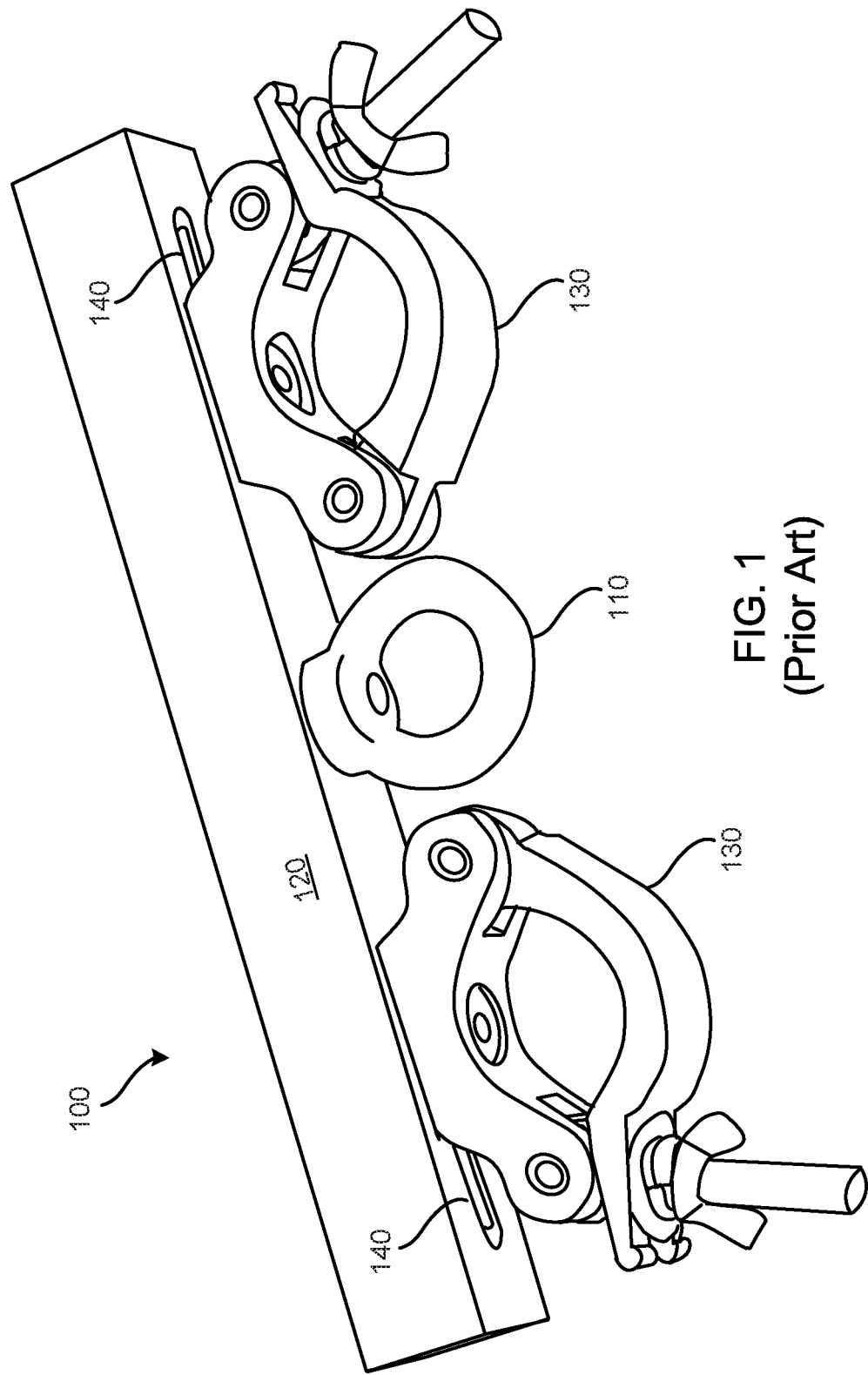
FIG. 1 is a perspective view of a prior art truss bar hanger.
Figure 3:
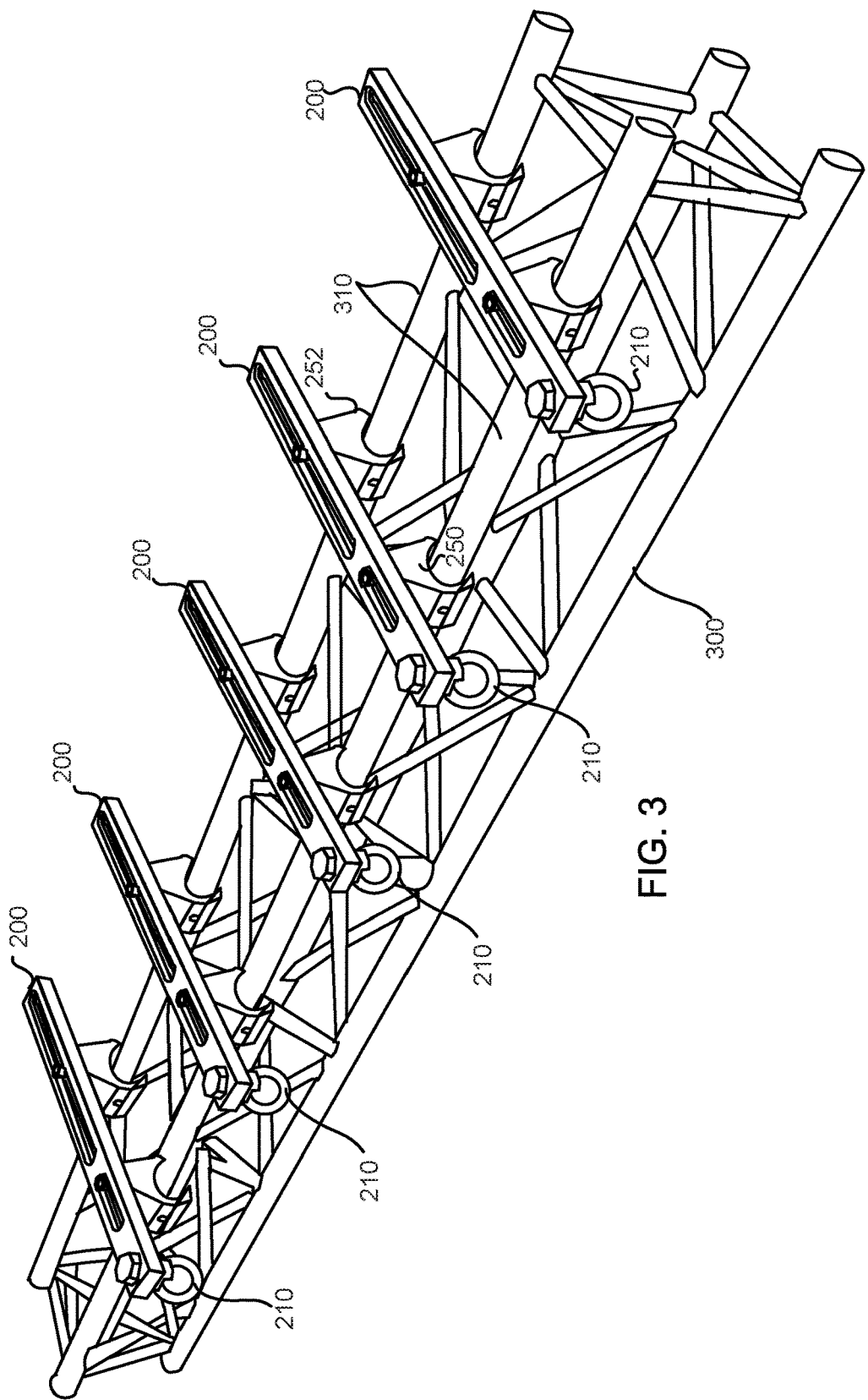
FIG. 3 is a perspective view of box truss including a plurality of video hanger truss bars mounted thereon in accordance with one particular embodiment of the invention.
Figure 4:
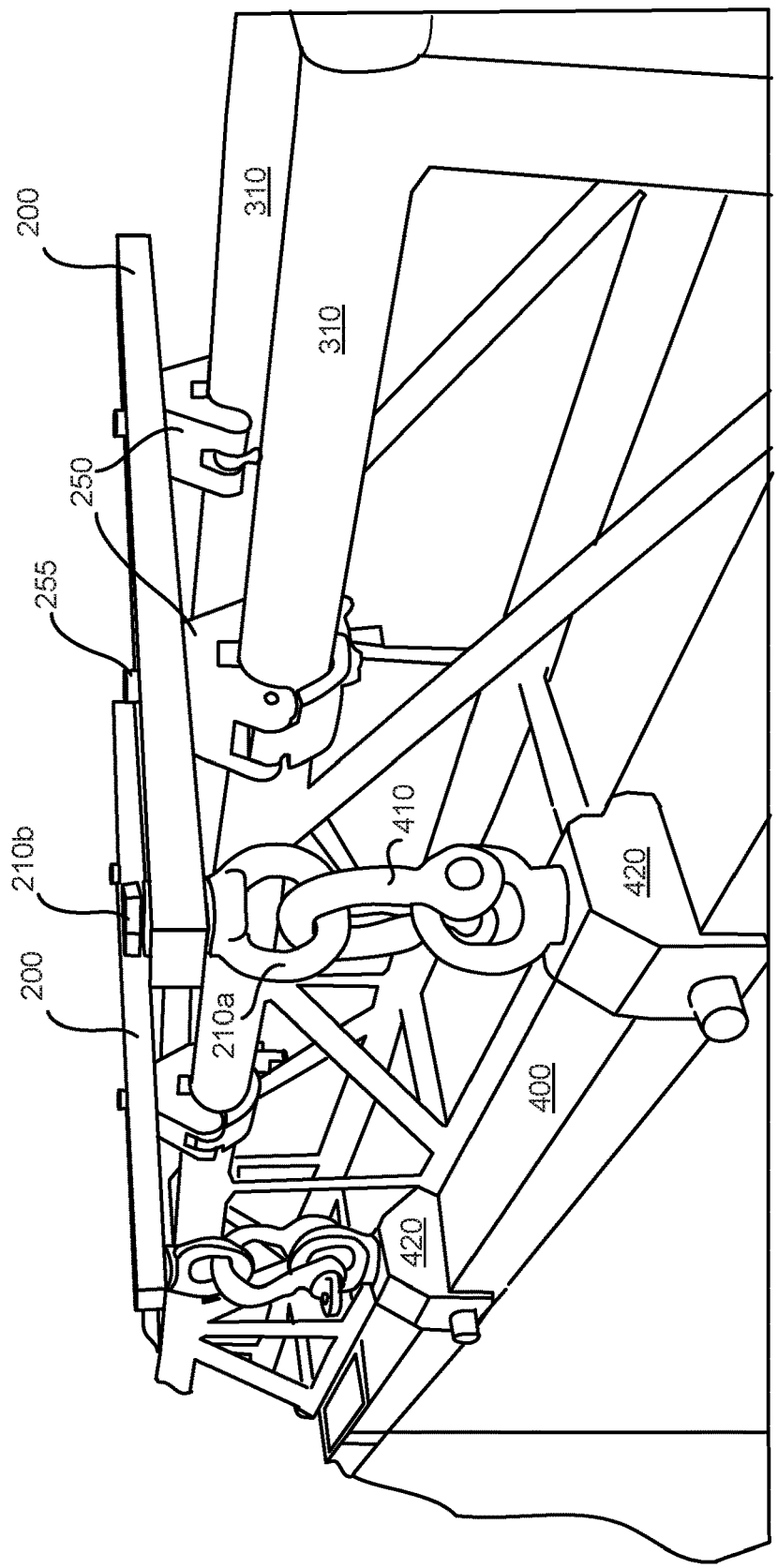
FIG. 4 is a partial perspective view of a video hanger truss bar in use according to one particular embodiment of the invention.

Referring now to FIGS. 2A-4, the present invention is directed towards a new and improved adjustable truss hanger 200 that provides a hang point 210 in front of the upper chords 310 of a horizontally oriented box truss 300. The front of the hanger bar 200 is defined by the presence of the hanging point 210, and is oriented towards the audience or front of the stage.

In one particular embodiment illustrated, the hanging point 210 is an eyebolt 210a fixed at one end of the bar 220 made from a solid bar 6061 T-6 aluminum with a nut 210b. In one embodiment, the eyebolt 210a is permanently attached to the bar 220, by welding and provides a safe and secure connection that supports weights of up to 500 kg (1100 lb.). Eyebolt 210a is oriented to allow quick connection to video rig bars with standard rigging shackles 410, round slings, or wire rope in order to hang panels 400 in front of the truss 300 (i.e., between the truss and the audience), from the upper chords 310.

Mounting bar 220 is provided with slots 230 and 240, to which coupler clamps 250, 252 are connected. In the illustrated embodiment, the coupler clamps 250, 252 are t-handle half coupler clamps, or other wrap around style coupler clamps, that are designed to fit over the chords 310 of the truss 300. In one particular embodiment, the clamps 250, 252 are made of heavy duty extruded aluminum and are sized to attach to the top of a box truss having 2 inch chords.

The coupler clamps 250, 252 are adjustable along the slots 230, 240, respectively, extending along the longitudinal axis of the bar 220. Each of the slots 230, 240 includes a lip or seat portion 235, 245, respectively, which permits the clamp bolts 255 to be at least partially countersunk into the slots 230, 240, and provides a surface against which the bolts 255 and/or an intervening washer 257 can be tightened in place. Clamp bolts 255 can be loosened or tightened using an Allen wrench or other tightening device.

In the present particular embodiment, the slots 230 and 240 are of different lengths. In the present embodiment, the front clamp 250 allows for adjustment to help with spacing between the backs of video panels or other types of panels and the face of the truss. In one particular embodiment, the slot 230 allows for 3.5 inches of adjustment to be performed. The rear slot 240 is sized to permit the rear clamp 252 to adjustably attach to the rear chord of the truss. In one particular embodiment, the clamp mounting points are adjustable to work with box truss up to 20.5" wide.

In use, the clamps 250 and 252 are attached to the front and rear upper chords 310 of the box truss 300 with the bolts 255 loose virtually anywhere on the truss length. This permits the clamps 250, 252 to slide to the needed spacing to attach to both upper chords at the top of a horizontally oriented box truss. Additionally, the distance between the front chord 310 to the hanging point 210 can be adjusted by moving the bar 220 with the clamp bolts 255 loosened. In the present embodiment, the length of the slot 230 limits the distance between the upper front chord 310 and the hanging point 210. Once the clamps 250, 252 are adjusted for the size of the truss being used, the clamp bolts 255 are tightened to ensure that the clamps 250, 252 are attached to the truss correctly and the clamp t-handles 260 are snugly tightened to grip the upper chords 310.

With the hanging point 210 positioned in front of the upper front chord 310 of the truss 300, a panel 400 can be connected to the hanging point 210 via a shackle 410 or other connector connected between a hanger 420 of the panel 400 and the eyebolt 210a of the hanging point 210. Thus, the panel 400 hangs in front of the truss 300 from the hanger bar 200, which projects as a cantilever from the upper trusses 310 of the truss 300. In one particular embodiment, a series of cantilevered hanger bars 200 will be mounted on the upper chords 310 of the truss 300 in order to support an array of panels 400. For example, a plurality of hanger bars 200 are used on a single truss 300 to support an entire video wall (i.e., several columns of video panels).

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended. Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

I claim:

1. A hanger bar for a horizontally oriented truss including a pair of top chords, the hanger bar comprising:
   an elongated body including a pair of elongated slots therethrough;
   a first clamp mounted to the elongated body slideably engaged with a first slot of said pair of elongated slots;
   a second clamp mounted to the elongated body slideably engaged with a second slot of said pair of elongated slots;
   a hanging point mounted at one end of the elongated body;
   each of said first clamp and said second clamp configured to engage and fit over a different top chord of the pair of top chords with said hanging point extending past the pair of top chords to support an object from said hanging point as a cantilever; and
   wherein each slot of the pair of elongated slots is a different length.

2. The hanger bar according to claim 1, wherein the first slot is closer to the hanging point than the second slot and is shorter than the second slot.

3. The hanger bar according to claim 1, wherein the position of the first and second clamps in the first and second slots is fixable by tightening a bolt of each of said first and second clamps.

4. The hanger bar according to claim 1, wherein the hanging point is an eyebolt permanently fixed in place on the elongated body.

5. The hanger bar according to claim 4, wherein the eyebolt is fixed by welding.

6. The hanger bar according to claim 1, wherein the first and second clamps are t-handle coupler clamps.

7. A method for hanging an object from a horizontally oriented truss including a pair of top chords, comprising the steps of:
   providing a hanger bar, including:
      an elongated body including a pair of elongated slots therethrough;
      a first clamp mounted to the elongated body slideably engaged with a first slot of said pair of elongated slots;
      a second clamp mounted to the elongated body slideably engaged with a second slot of said pair of elongated slots;
      a hanging point mounted at one end of the elongated body;
      each of said first clamp and said second clamp configured to engage and fit over a different top chord of the pair of top chords with said hanging point extending past the pair of top chords to support an object from said hanging point as a cantilever;
      wherein each slot of the pair of elongated slots is a different length;
   mounting the hanger bar to the two different top chords of the pair of top chords of the truss with the hanging point extending past a front of the truss to form a cantilevered hanging point; and
   hanging an object from the hanging point in front of the truss.

8. The method of claim 7, wherein the mounting step includes mounting the hanger bar to at least the two upper chords of the truss.

9. The method of claim 7, wherein the hanging step includes hanging a video panel as the object.

10. The method of claim 7, wherein the hanging step includes hanging a portion of a video wall as the object.

11. The method of claim 7, wherein the truss is a box truss and the hanger bar is mounted to the two upper chords of the box truss, in the hanging step, with the hanging point oriented between the box truss and a viewer.

12. The method according to claim 7, wherein the first slot is closer to the hanging point than the second slot and is shorter than the second slot.

13. The method according to claim 7, further including the step of tightening a bolt of each of said first clamp and said second clamp to fix the position of the first and second clamps in the first and second slots.

14. The hanger bar according to claim 7, wherein the hanging point is an eyebolt permanently fixed in place on the elongated body.

\* \* \* \* \*